US00RE44108E

(19) United States
(12) Reissued Patent
Hilleary et al.

(10) Patent Number: US RE44,108 E
(45) Date of Reissued Patent: Mar. 26, 2013

(54) METHOD OF PRODUCING FLAME RETARDANT TEXTILE FABRIC

(75) Inventors: Scott Hilleary, Spring City, TN (US); Greg Watson, Spring City, TN (US)

(73) Assignee: SSM Industries, Inc., Spring City, TN (US)

(21) Appl. No.: 13/212,743

(22) Filed: Aug. 18, 2011

Related U.S. Patent Documents

Reissue of:
(64) Patent No.: 7,575,783
Issued: Aug. 18, 2009
Appl. No.: 12/028,951
Filed: Feb. 11, 2008

U.S. Applications:
(62) Division of application No. 11/389,783, filed on Mar. 27, 2006, now Pat. No. 7,915,185.

(51) Int. Cl.
*B05D 3/02* (2006.01)
*B05D 3/10* (2006.01)

(52) U.S. Cl. ..... 427/342; 427/337; 427/359; 427/365; 427/369; 427/372.2; 427/384; 427/385.5; 427/389.9; 427/393.3; 427/394

(58) Field of Classification Search ..... None
See application file for complete search history.

(56) References Cited

U.S. PATENT DOCUMENTS

| | | | | | |
|---|---|---|---|---|---|
| 3,607,356 | A * | 9/1971 | Beninate et al. | 442/71 |
| 3,933,122 | A * | 1/1976 | Wagner | 118/718 |
| 3,957,881 | A * | 5/1976 | LeBlanc et al. | 252/609 |
| 4,045,173 | A * | 8/1977 | Rowland | 8/182 |
| 4,081,887 | A * | 4/1978 | Holden | 28/271 |
| 4,095,945 | A * | 6/1978 | Umetani et al. | 8/115.7 |
| 4,137,346 | A * | 1/1979 | Wagner | 427/341 |
| 4,154,878 | A * | 5/1979 | Baitinger et al. | 427/341 |
| 5,135,541 | A * | 8/1992 | Cole et al. | 8/127.1 |
| 5,690,874 | A * | 11/1997 | Bell et al. | 264/129 |
| 6,706,650 | B2 * | 3/2004 | Gibson et al. | 442/167 |
| 6,735,789 | B2 * | 5/2004 | Kelleher et al. | 2/458 |
| 6,787,228 | B2 * | 9/2004 | Campbell et al. | 428/365 |
| 2003/0129902 | A1 * | 7/2003 | Hensler et al. | 442/138 |
| 2003/0150043 | A1 * | 8/2003 | Koppes | 2/69 |
| 2003/0232560 | A1 * | 12/2003 | Corner | 442/401 |
| 2004/0121114 | A1 * | 6/2004 | Piana et al. | 428/85 |
| 2004/0152378 | A1 * | 8/2004 | Stanhope et al. | 442/5 |
| 2004/0242101 | A1 * | 12/2004 | Shoemaker | 442/118 |
| 2006/0233957 | A1 * | 10/2006 | Collins | 427/365 |

FOREIGN PATENT DOCUMENTS

| | | | |
|---|---|---|---|
| GB | 934066 | * | 8/1963 |
| WO | WO 96/05356 | * | 2/1996 |
| WO | WO 00/29662 | * | 5/2000 |

OTHER PUBLICATIONS

Lyons John W., "Cellulose: Textiles", The Chemistry and Uses of Fire Retardants, (1970), p. 198.*

Mukhin B. A. et al, "Fire Resistant Viscose Rayon and Polyamide Yarns—A Review"; Fibre Chemistry, Kluwer Academic Publishers—Plenum Publishers, NE, No. 7, Jul. 1, 1976, pp. 347-356; XP009088716.*

International Search Report and Written Opinion for PCT/US2007/063872 filed Mar. 13, 2007.*

* cited by examiner

*Primary Examiner* — Erma Cameron
(74) *Attorney, Agent, or Firm* — Alston & Bird LLP

(57) ABSTRACT

A high performance flame retardant textile fabric is provided which is suitable for use in producing close-fitting garments, such as undergarments, that come into direct contact with the skin of the wearer and provide a protective function, as well as in non-apparel applications. The fabric is formed of yarns of rayon continuous filaments, the yarns having outer filaments along the periphery of the yarn and inner filaments in the interior of the yarn. A cured phosphorus-based flame retardant compound is durably affixed to the filaments and imparts flame retardant properties to the fabric. The outer filaments of the yarns have a phosphorus content at least 25% greater than the inner filaments of the yarn.

5 Claims, 3 Drawing Sheets

METHOD OF PRODUCING FLAME RETARDANT TEXTILE FABRIC

Matter enclosed in heavy brackets [ ] appears in the original patent but forms no part of this reissue specification; matter printed in italics indicates the additions made by reissue.

CROSS-REFERENCE TO RELATED APPLICATIONS

This application is a divisional of U.S. application Ser. No. 11/389,783 filed Mar. 27, 2006 *now U.S. Pat. No. 7,915,185*, which is hereby incorporated herein in its entirety by reference.

FIELD AND BACKGROUND OF THE INVENTION

The present invention relates to a high performance textile fabric and to garments produced from such a fabric. More particularly, the invention relates to the manufacture of a flame retardant textile fabric suited for use in producing close-fitting garments, such as undergarments, that come into direct contact with the skin of the wearer and provide a protective function. The textile fabric is also has applicability for use in various non-apparel applications.

Garments of this type can be used by the military, police, firefighters, and in sporting applications. The garments must be comfortable, breathable and must have good moisture wicking properties so that perspiration is wicked away from the skin. In addition, the fabric must be capable of being produced either as a white fabric or of being dyed in a variety of bright lightfast colors. Another important criterion is that the garment must be flame retardant.

Nomex® fiber produced by DuPont is widely used in flame retardant fabrics because of its inherent flame retardant properties. However, fabrics made from this fiber are uncomfortable in hot environments and next to the skin. Additionally, the fiber is available only in a limited number of producer-dyed colors and has an inherent yellow color.

There exists a need for a high performance flame retardant fabric that is hydrophilic, exhibiting good moisture wicking properties, and which is comfortable in direct contact with the skin.

SUMMARY OF THE INVENTION

In accordance with the present invention, the requisite moisture wicking properties and skin contact comfort characteristics are achieved with a textile fabric formed of yarns of rayon continuous filaments. A fabric formed from continuous filament rayon yarns is superior to one produced from staple fiber rayon yarns in terms of processability, tenacity and most importantly, in low-friction characteristics. Fabrics of continuous filament rayon yarns are smooth and slick, with a low friction coefficient so that they do not tend to chafe. In addition, the fabrics are softer and more supple than fabrics from spun staple fibers, providing better conformability to the body. Also, the continuous filament yarns can be produced in much finer sizes than staple fiber yarns, permitting fabrics of lower weights than is practical with staple fiber yarns.

Rayon is not inherently flame retardant. However, rayon fabrics can be rendered flame retardant by treatment with a phosphorus-based flame retardant compound. Various flame retardant treatment processes have been developed for use with fabrics made from spun yarns of cotton and other cellulosic staple fibers, including rayon. One known treatment process for providing flame retardant properties to fabrics from staple fiber yarns involves impregnation of the material with an aqueous solution containing a hydroxymethyl phosphonium compound in a padding operation and then curing the compound on the fabric. Such hydroxymethyl phosphonium compounds include tris hydroxymethyl phosphonium ("THP") and tetrakis hydroxymethyl phosphonium hydroxide ("THPOH"). While these known processes have performed satisfactorily with fabrics formed from staple fiber yarns, they provide inadequate flame retardant properties when applied to fabrics yarns formed from continuous filament rayon. Therefore, a need exists for a continuous filament rayon textile fabric that that provides comfort and durability, and that exhibits satisfactory flame retardant properties.

The present invention is based upon the recognition that a textile fabric formed from yarns of continuous filament rayon behaves differently than a fabric formed from staple fiber rayon when subjected to a flame retardant treatment process using a phosphorus-based flame retardant compound. By altering the flame retardant treatment process, applicants have produced a flame retardant fabric with a unique combination of properties and characteristics.

The flame retardant continuous filament rayon fabrics produced in accordance with the present invention exhibit a distribution of the phosphorus flame retardant compound within the yarn that is distinctly different from the distribution achieved using the known flame retardant treatment processes. According to one broad aspect, flame retardant textile products in accordance with the present invention comprise a fabric formed of yarns of rayon continuous filaments, the yarns having outer filaments along the periphery of the yarn and inner filaments in the interior of the yarn, a cured phosphorus-based flame retardant compound durably affixed to the filaments and imparting flame retardant properties to the fabric, and wherein the outer filaments of the yarns have a phosphorus content at least 25% greater than the inner filaments. In a more specific aspect, the outer filaments have a phosphorus content at least 40% greater than the inner filaments. In a further embodiment the cured phosphorus-based flame retardant compound is a hydroxymethyl phosphonium compound.

In another aspect, the present invention provides a textile product having flame retardant properties and comprising a woven or knitted fabric formed of yarns of rayon continuous filaments. The yarns have outer filaments along the periphery of the yarn and inner filaments in the interior of the yarn, and a cured insoluble hydroxymethyl phosphonium flame retardant compound is present on the fabric at an add-on level of at least 20% by weight of the fabric imparting flame retardant properties to the fabric. The outer filaments of the yarns are adhered to one another by the cured insoluble flame retardant compound. In a further aspect, the outer filaments of the yarns have a phosphorus content at least 25% greater than the inner filaments. It has been observed that certain fabrics treated in accordance with the present invention have a cantilever stiffness pursuant to ASTM D 1388 option A that is at least 25% greater in the filling direction than in the warp direction.

The present invention also provides a garment for direct contact with the skin of a wearer, the garment having hydrophilic properties for wicking moisture away from the skin of the wearer and having low friction properties to avoid chafing. The garment comprises a woven or knitted fabric formed of yarns of rayon continuous filaments, the yarns having outer filaments along the periphery of the yarn and inner filaments in the interior of the yarn. A cured phosphorus-based flame retardant compound is durably affixed to the filaments and imparts flame retardant properties to the fabric. The outer filaments of the yarns have a phosphorus content at least 25% greater than the inner filaments.

In another aspect, the present invention provides a method of treating a textile product to impart flame retardant properties, comprising the steps of: providing a fabric formed of yarns of rayon continuous filaments, the yarns having outer filaments along the periphery of the yarn and inner filaments in the interior of the yarn; directing the fabric into and through a pad bath containing a phosphorus-based flame retardant compound; compressing the fabric with a first set of cooperating rolls to force the flame retardant compound into the fabric and to impregnate the yarns of the fabric; subsequently compressing the fabric with a second set of cooperating rolls to effect a second forcing of the flame retardant compound into the fabric and to impart an additional impregnation of the yarns of the fabric by the flame retardant compound so that the outer filaments of the yarns have a phosphorus content at least 25% greater than the inner filaments; and curing the flame retardant compound on the fabric to render it insoluble and durably affixed to the fabric.

BRIEF DESCRIPTION OF THE SEVERAL VIEWS OF THE DRAWINGS

Figure 1:
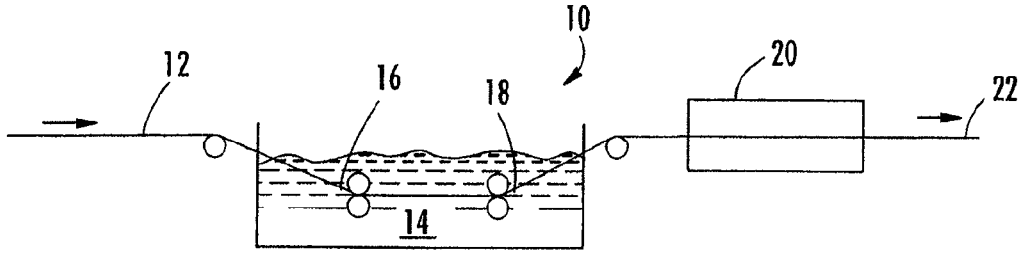
Figure 2:
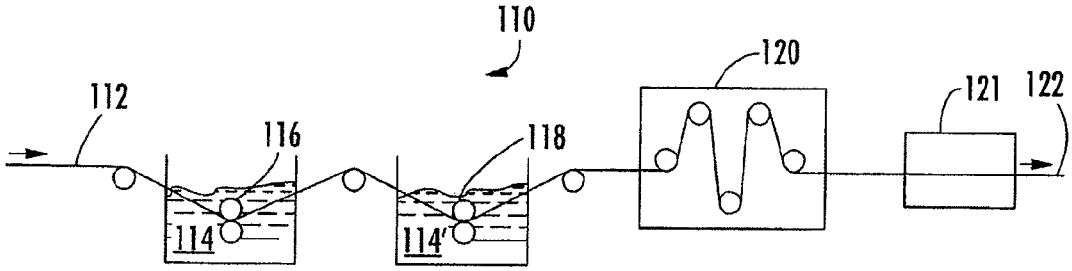
Figure 3:
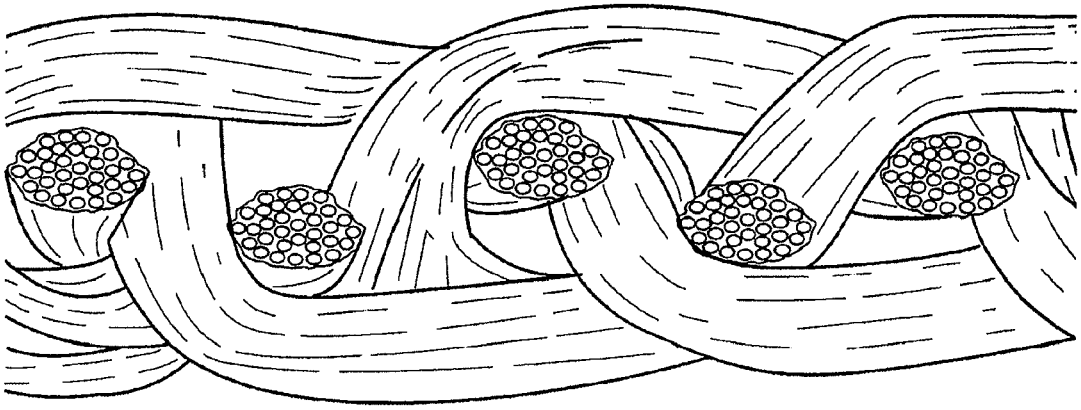
Figure 4:
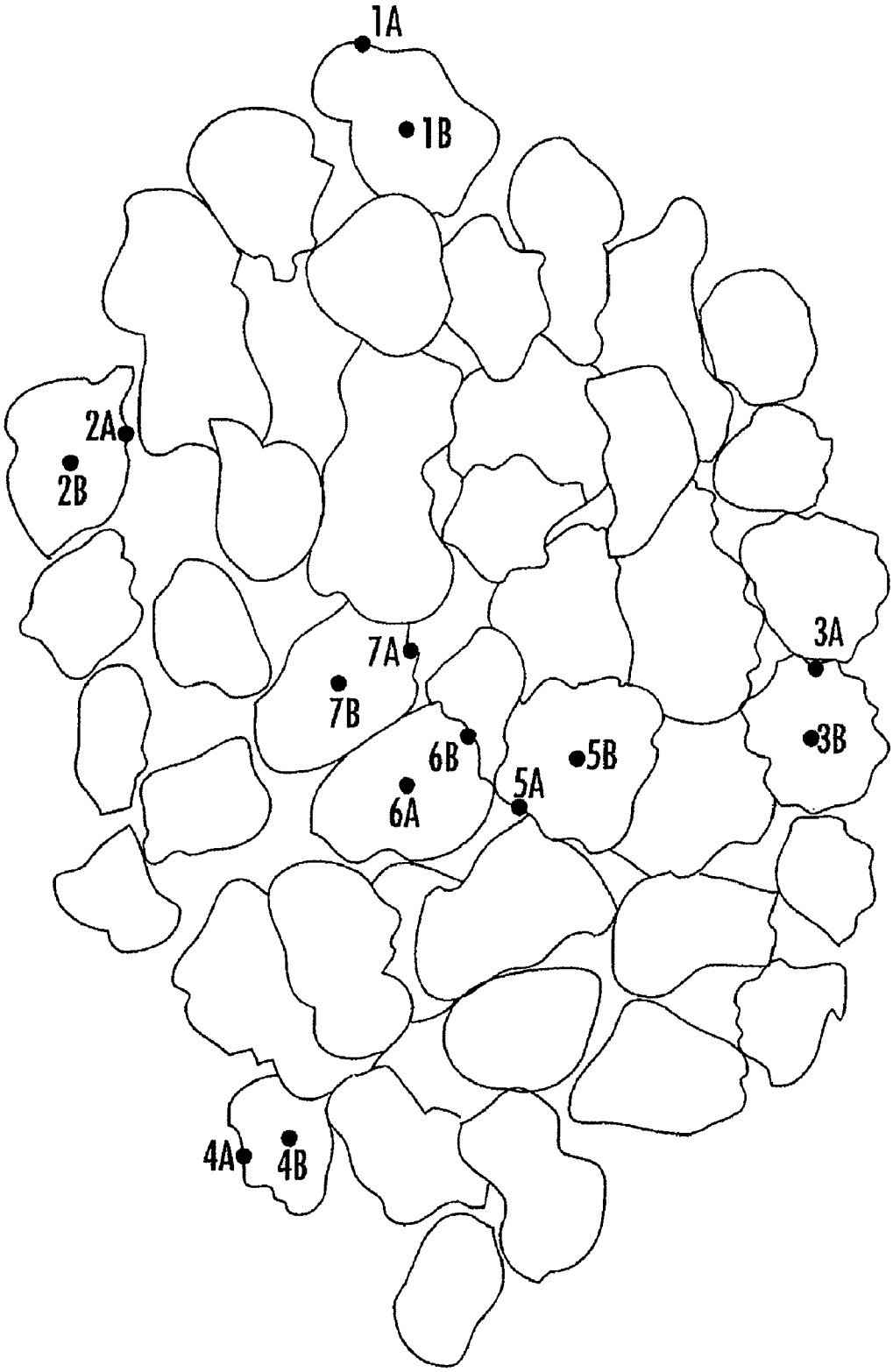

Having thus described the invention in general terms, reference will now be made to the accompanying drawings, which are not necessarily drawn to scale, and wherein:

FIG. 1 is a schematic side view of a flame retardant treatment process in accordance with one embodiment of the present invention, illustrating a dip-squeeze, dip-squeeze technique in a single bath containing a hydroxymethyl phosphonium compound followed by a heat cure process;

FIG. 2 is a schematic side view of a flame retardant treatment process in accordance with a second embodiment of the present invention, illustrating a dip-squeeze, dip-squeeze technique in two separate baths, each containing a hydroxymethyl phosphonium compound followed by an ammonia cure process;

FIG. 3 is a cross-section of a fabric formed of yarns of rayon continuous filaments treated in accordance with embodiments of the present invention; and FIG. 4 is a cross-sectional view at a higher magnification of a portion of the fabric of FIG. 3 showing a single yarn and indicating several locations within the yarn which were sampled and tested for the percent phosphorus content.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The textile products and fabrics described herein comprise rayon continuous filaments. As used herein, the term "rayon" refers to regenerated cellulose fiber produced by any of a number of available processes which involve chemically converting cellulose into a soluble form, extruding through a spinneret to form filaments, and then solidifying. Non-limiting examples include viscose rayon, high wet modulus rayon, cuprammonium rayon and saponified acetate rayon. Also included are cellulosic textile fibers produced by a solvent process, such as lyocell and Tencel®. Also included is polynosic rayon, which has a very high degree of orientation, achieved as a result of very high stretching (up to 300%) during processing. Polynosic rayon filaments have a unique fibrillar structure, high dry and wet strength, low elongation (8 to 11%), relatively low water retention and very high wet modulus.

The textile products of the present invention are produced from yarns formed from continuous filament rayon, as opposed to spun yarns produced from staple fiber rayon. The filaments making up a continuous filament rayon yarn extend generally parallel to one another along the length of the yarn and tend to be packed or bunched closely together. Continuous filament rayon yarns used in the present invention preferably have very low twist, typically from 0 to no more than 3 tpi (turns per inch). Typically, the fabrics are formed from singles yarns, although for some fabric constructions plied yarns may be used.

With reference to FIG. 1, a flame retardant treatment process 10 in accordance with one embodiment of the present invention is illustrated. A fabric 12 formed of yarns of continuous filament rayon is directed from a supply source (not shown), such as a roll of fabric, and is fed around rollers or similar devices and into a pad bath 14 containing a phosphorus-based retardant treatment composition. The treatment composition contains a hydroxymethyl phosphonium composition, such as a bath of THP, THPOH, or THPOH-urea precondensate. As the fabric 12 travels through the pad bath 14 it is saturated with the treatment composition and then passes through a nip of a first cooperating pair of rolls 16 which squeeze the fabric and force the treatment composition into the fabric. In the embodiment shown in FIG. 1, the fabric remains immersed in the treatment solution after the initial dip-squeeze treatment and again becomes thoroughly saturated with the treatment composition. It then passes through the nip of a second cooperating pair of rolls 18 which again squeeze the fabric and force the treatment composition into the fabric. The fabric then emerges from the pad bath 14 and is directed to a curing operation. In an alternative embodiment (not shown) the rolls 16, 18 may be located above the surface of the treatment solution in the pad bath and the fabric 12 may be directed by one or more immersed guide rolls so as to be dipped repeatedly into the pad bath 14 to undergo the two successive dip-squeeze treatments. In either event, during the treatment process a first amount of hydroxymethyl phosphonium compound is added onto the rayon continuous filaments based upon the first dip-squeeze treatment, and a second amount of hydroxymethyl phosphonium compound is added onto the rayon continuous filaments based upon the second dip-squeeze treatment.

In the embodiment shown in FIG. 2 the flame retardant treatment process 110 is carried out in two separate, successively arranged pad baths 114 and 114'. While the two pad baths could contain the same treatment composition, this embodiment makes it possible to treat the fabric with two different treatment compositions, differing in concentration, composition, or both. In the embodiment shown, the rolls 116 of the first pad bath 114 and the rolls 118 of the second pad bath 114' are submerged in the treatment solution. In an alternative embodiment (not shown) the rolls 116 and 118 may be located above the surface of the treatment solution in the pad bath and the fabric 112 may be dipped into the treatment solution by use of submerged guide rolls.

After the fabric has been subjected to the dip-squeeze, dip-squeeze process of the present invention, the add-on of the hydroxymethyl phosphonium compound is cured so that it becomes insoluble and durably affixed to the rayon continuous filaments, rendering the fabric flame retardant. FIG. 1 illustrates an oven 20 which cures the treatment composition by exposure to heat. The treated fabric 22 may then be subjected to subsequent fabric finishing steps as is conventional. FIG. 2 illustrates an ammonia cure process which passes the fabric 112 through an ammonia chamber 120 to expose the uncured composition to gaseous ammonia, bringing about a reaction that cures or polymerizes the treatment composition. FIG. 2 additionally illustrates a neutralizing chamber 121 that neutralizes the fabric subsequent to the curing of the add-on of the hydroxymethyl phosphonium solution. The fabric may thereafter be directed through one or more additional operations (not shown) such as washing, etc. Subsequently, the fabric is directed through a dryer or tenter frame (not shown) which dries the fabric. The cured, dry flame retardant fabric 122 may then be suitably collected for subsequent use.

The following non-limiting example is provided to illustrate an exemplary treatment process.

EXAMPLE

A first pad bath is filled with a treatment solution containing 150 pounds of THPOH-urea precondensate (Guardex FR-TP, 75% solids from Guardex, Inc. Thomasville, N.C.), 9 pounds of wetting agent (Guardex WT-TPS) and 140 pounds of water. A second pad bath is filled with a treatment solution of identical composition to the first pad bath. Filament rayon warp knit fabric (7.0 ounces per square yard) is padded through the two pad baths in succession attaining 27.4% solids add-on by weight after the second dip-squeeze treatment. The impregnated fabric is exposed to gaseous ammonia by passing through two successive gaseous ammonia chambers. Chamber temperatures were maintained at 85 to 130° F. to assure complete reaction of the THPOH/urea precondensate with ammonia, forming an insoluble THPOH/urea-$NH_3$ polymer within the yarns forming the fabric. The treated fabric is then afterwashed open-width by passing through one or more baths containing peroxide to insolubize the phosphorus-containing flame retardant. Next, the fabric is neutralized. The fabric is then placed on a tenter frame and dried.

The add-on of 27.4% by weight achieved by this process is considerably higher than the levels attained using the one-step treatment process conventionally used for fabrics formed from cotton yarns. The same fabric when subjected to a single dip-squeeze treatment achieved only a 15% add-on. Fabrics in accordance with the present invention may suitably contain the cured insoluble phosphorus-containing polymer the add-on levels achieved by the process of the present invention without adverse affects on the properties of the fabric. The cured insoluble polymer adheres filaments within the yarn to one another, but does not undesirably affect the softness, suppleness or hydrophilic wicking properties of the fabric. Analysis of the fabric treated by this process also reveals that the distribution of the phosphorus-containing compound within the yarns of the fabric is distinctly different from the distribution achieved using a conventional one step treatment process.

FIG. 3 is a cross-sectional view of a fabric formed of yarns of continuous filament rayon having been subjected to the treatment process of the present invention. FIG. 4 is a cross-sectional view at a higher magnification showing the individual filaments of a single yarn. The numbers 1 to 7 in FIG. 4 represent the locations of individual filaments where samples were taken for analysis of percent phosphorus content (% P). The numbers 1 to 4 identify four filaments located at the outer periphery of the yarn. The numbers 5 to 7 identify three filaments located in the interior or core of the yarn. For each of the filament locations 1 to 7, two analyses were made, one at the surface of filament, indicated by "A" and one at the interior or core of the individual filament, indicated by "B". These locations are represented by the dots shown on the respective filaments.

The following Table 1 is a chart showing the % P values taken from these analyses.

TABLE 1

% P for Rayon Continuous Filament Yarn After Dip-squeeze, Dip-squeeze Process of the Present Invention

| | Outer Filaments | | Inner Filaments | |
|---|---|---|---|---|
| Data Point | Skin | Core | Skin | Core |
| 1 | 3.6 | 4.6 | | |
| 2 | 5.2 | 4.7 | | |
| 3 | 5.2 | 6.8 | | |
| 4 | 6.5 | 5.9 | | |
| 5 | | | 1.9 | 2.7 |
| 6 | | | 5.2 | 4.3 |
| 7 | | | 2.4 | 4.6 |
| Avg. | 5.1 | 5.5 | 3.2 | 3.9 |

For comparison, similar tests were performed on several fabric samples, as follows: the rayon continuous filament fabric subjected to a single dip-squeeze process (Table 2); a fabric formed from spun staple fiber rayon yarns subjected to the dip, dip-squeeze process of the present invention (Table 3); spun staple fiber rayon yarns subjected to the single dip-squeeze process (Table 4); spun staple fiber cotton yarns subjected to the dip-squeeze, dip-squeeze process of the present invention (Table 5); and spun staple fiber cotton yarns subjected to the single dip-squeeze process (Table 6). The fabrics tested for Tables 2-6 had generally comparable deniers, thread counts and weave patterns as compared to the fabric of Table 1 and all six fabrics were treated in the same hydroxymethyl phosphonium compound solution. For ease of comparison, Table 7 combines the average for all six tests.

TABLE 2

% P for Rayon Continuous Filament Yarn After Single Dip-squeeze Process

| | Outer Filaments | | Inner Filaments | |
|---|---|---|---|---|
| Data Point | Skin | Core | Skin | Core |
| 1 | 1.5 | 2.5 | | |
| 2 | 1.2 | 1.8 | | |
| 3 | 3.6 | 1.6 | | |
| 4 | | | 1.6 | 2.1 |
| 5 | | | 2.2 | 2.5 |
| Avg. | 2.1 | 2.0 | 1.9 | 2.3 |

TABLE 3

% P for Spun Staple Fiber Rayon Yarn After Dip-squeeze, Dip-squeeze Process

| | Outer Fibers | | Inner Fibers | |
|---|---|---|---|---|
| Data Point | Skin | Core | Skin | Core |
| 1 | 5.2 | 7.7 | | |
| 2 | 3.5 | 6.8 | | |
| 3 | 7.2 | 7.0 | | |
| 4 | | | 6.7 | 6.3 |

TABLE 3-continued

| % P for Spun Staple Fiber Rayon Yarn After Dip-squeeze, Dip-squeeze Process | | | | |
|---|---|---|---|---|
| | Outer Fibers | | Inner Fibers | |
| Data Point | Skin | Core | Skin | Core |
| 5 | | | 4.2 | 6.0 |
| Avg. | 5.3 | 7.2 | 5.5 | 6.2 |

TABLE 4

| % P for Spun Staple Fiber Rayon Yarn After Single Dip-squeeze Process | | | | |
|---|---|---|---|---|
| | Outer Fibers | | Inner Fibers | |
| Data Point | Skin | Core | Skin | Core |
| 1 | 6.3 | 6.9 | | |
| 2 | 3.9 | 4.3 | | |
| 3 | 2.8 | 5.0 | | |
| 4 | | | 3.8 | 4.3 |
| 5 | | | 4.5 | 6.6 |
| Avg. | 4.3 | 5.4 | 4.2 | 5.5 |

TABLE 5

| % P for Spun Staple Cotton Yarn After Dip-squeeze, Dip-squeeze Process | | | | |
|---|---|---|---|---|
| | Outer Fibers | | Inner Fibers | |
| Data Point | Skin | Core | Skin | Core |
| 1 | 2.5 | 3.1 | | |
| 2 | 3.2 | 4.6 | | |
| 3 | 3.9 | 4.6 | | |
| 4 | | | 5.7 | 6.4 |
| 5 | | | 3.8 | 5.3 |
| Avg. | 3.2 | 4.1 | 4.8 | 5.8 |

TABLE 6

| % P for Spun Staple Cotton Yarn After Single Dip-squeeze Process | | | | |
|---|---|---|---|---|
| | Outer Fibers | | Inner Fibers | |
| Data Point | Skin | Core | Skin | Core |
| 1 | 2.0 | 2.9 | | |
| 2 | 2.6 | 2.0 | | |
| 3 | 1.4 | 2.0 | | |
| 4 | | | 1.6 | 2.9 |
| 5 | | | 2.9 | 3.6 |
| Avg. | 2.0 | 2.3 | 2.2 | 3.2 |

TABLE 7

| Summary of Average % P for Test Data of Tables 1 Through 6 | | | | |
|---|---|---|---|---|
| | Outer Filaments/ Fibers | | Inner Filaments/ Fibers | |
| Fabric | Skin | Core | Skin | Core |
| Dip-squeeze, Dip-squeeze Filament Rayon | 5.1 | 5.5 | 3.2 | 3.9 |
| Dip-squeeze Filament Rayon | 2.1 | 2.0 | 1.9 | 2.3 |

TABLE 7-continued

| Summary of Average % P for Test Data of Tables 1 Through 6 | | | | |
|---|---|---|---|---|
| | Outer Filaments/ Fibers | | Inner Filaments/ Fibers | |
| Fabric | Skin | Core | Skin | Core |
| Dip-squeeze, Dip-squeeze Spun Rayon | 5.3 | 7.2 | 5.5 | 6.2 |
| Dip-squeeze Spun Rayon | 4.3 | 5.4 | 4.2 | 5.5 |
| Dip-squeeze, Dip-squeeze Spun Cotton | 3.2 | 4.1 | 4.8 | 5.8 |
| Dip-squeeze Spun Cotton | 2.0 | 2.3 | 2.2 | 3.2 |

As indicated by a comparison of the data of Tables 1 and 2, the rayon continuous filament yarns have a % P add-on of approximately 2.1 (average of 2.1, 2.0, 1.9, and 2.3) after a single dip-squeeze process and have a % P add-on of approximately 4.4 (average of 5.1, 5.5, 3.2, and 3.9) after the dip-squeeze, dip-squeeze process, an increase of about 113%. This increase from 2.1 to 4.4 was unexpected since standard single dip-squeeze processes afford diminished returns as the material becomes increasingly saturated. In comparison, the spun rayon fabric exhibited expected results wherein the additional phosphorus added to the fabric as a result of two successive dip-squeeze treatments was comparatively lower. Analysis of the data in Tables 3 and 4 for the spun rayon yarns reveals that the % P was increased from an average of 4.85 to 6.05, an increase of only 25%.

In addition, the test data revealed that the treatment process of the present invention resulted in a markedly different distribution of the phosphorus within the yarn of the fabric as compared to the single dip-squeeze process. For continuous filament rayon fabrics subjected to the single dip-squeeze process of the prior art, Table 2 reveals that the phosphorus content of the filaments at the surface of the yarn was not significantly different from the filaments in the interior of the yarn. However, the continuous filament rayon fabric subjected to the dip-squeeze, dip-squeeze process of the present invention had a significantly greater add-on of phosphorus on the outer filaments of the yarn as compared to the inner filaments. More specifically, Table 1 shows that the outer filaments of the yarn treated according to process of the present invention had an average % P of 5.3 which was more than 40% greater than the average % P for the inner filaments (% P of 3.55). As seen from Table 2, after a single squeeze, dip process, the outer and inner filaments of the yarn did not differ significantly in phosphorus content. Continuous filament rayon yarns processed with the flame resistance treatment process of the present invention are characterized by the outer filaments of the yarn having a significantly greater phosphorus content than the interior filaments of the yarn. Preferably, the outer filaments along the periphery of the yarn have a phosphorus content at least 25% greater than that of the interior filaments of the yarn, and more preferably at least 40% greater.

To further confirm the significance of the second dip-squeeze process of the flame retardant treatment process of the present invention, stiffness data was collected to determine the effect on stiffness that the add-on of hydroxymethyl phosphonium provides. Table 8 below provides stiffness data for each of the six tested fabrics. The stiffness tests were preformed in accordance with the American Society for Testing and Materials (ASTM) process D 1388 Option A by the Cantilever Drape Method at a 45 degree angle. The ASTM D 1388 test procedure is incorporated by reference herein. The stiffness value is reported in inches with the higher values indicating greater stiffness. The stiffness was measured in both the warp direction and the filling direction and the results listed below are each the average of five data points. Greater stiffness is generally indicative of more effective flame retardant treatment of the fabrics.

TABLE 8

Stiffness Data (in Inches) in the Warp Direction and the Filling Direction for Six Fabrics

| Fiber | Warp | Filling |
|---|---|---|
| Dip-squeeze, Dip-squeeze Rayon Filament | 0.854 | 1.3624 |
| Dip-squeeze Rayon Filament | 0.702 | 0.7874 |
| Dip-squeeze, Dip-squeeze Spun Rayon | 1.929 | 1.830 |
| Dip-squeeze Spun Rayon | 1.762 | 1.684 |
| Dip-squeeze, Dip-squeeze Spun Cotton | 1.761 | 1.278 |
| Dip-squeeze Spun Cotton | 1.309 | 0.856 |

Table 8 reflects the general expectation that the stiffness in both the warp and filling directions for each of the three types of fabrics would increase from the dip-squeeze process of the prior art to the dip-squeeze, dip-squeeze process of the present invention. However, it was observed that for the particular fabric specimen tested, the stiffness in the filling direction was increased significantly more by the dip-squeeze, dip-squeeze process of the invention as compared to the single dip-squeeze treatment. This difference in stiffness in the warp direction and filling direction was not expected. The dip-squeeze, dip-squeeze process of the present invention affords satisfactory flame retardant properties while having an overall stiffness (average of both the warp direction stiffness and filling direction stiffness) that is less than spun rayon fabrics that have undergone a single dip-squeeze process and that is generally comparable to spun cotton that has undergone a single dip-squeeze process.

Fabrics of continuous filament rayon yarns, due to the filamentary nature, are well suited for certain garment layers, such as undergarments or clean room apparel for example. Such garments exhibit hydrophilic and low-friction properties to provide a comfortable "second skin" or other garment that directly contacts the user's skin. It is important for such undergarments to have suitable flame resistance properties, particularly for use in certain applications such as firefighting and the military. Fabrics of rayon continuous filament yarn treated by the flame retardant treatment processes of the present invention are well suited for such garments and are significantly more comfortable and affordable than similar flame retardant garments made of KEVLAR® or NOMEX®.

Textile products treated by the flame retardant treatment process of embodiments of the present invention exhibit flame resistant properties that meet or exceed the ASTM F 1506-98 performance specification for flame resistance of textile materials for use in certain applications. The disclosure of the ASTM F 1506-98 specification is incorporated by reference herein. More specifically, the textile products of rayon continuous filament yarns treated by the flame retardant treatment process of embodiments of the present invention satisfy the flammability requirements of the ASTM F 1506-98 specification, either initially or after 25 washes or dry cleanings, when tested in accordance with FTMS 191 A, Method 5903.1. FTMS 191A, Method 5903.1 was adopted into the ASTM D 6413-99 specification (see section 5.4 of ASTM D 6413-99) for a standard test method for flame resistance of textiles (vertical test), the disclosure of which is incorporated by reference herein. The flame retardant treatment process of various embodiments of the present invention are used to treat woven fabrics of rayon continuous filament yarns such that the woven fabrics comply with the flammability requirements of Table 1 of ASTM F 1506-98.

The flame retardant fabric of the present invention can also be used in a variety of non-apparel applications where it is desired to improve the resistance of articles to burning. For example, the fabric may be used as a barrier layer on mattresses, box springs, cushions, pillows, comforters and upholstered furniture, either as an outer cover or ticking, or as a protective under-layer beneath an outer upholstery fabric layer. The fabrics can be advantageously employed on such products to improve the resistance to flame for meeting governmental regulations on flammability.

In addition, textile products in accordance with some embodiments of the present invention may be used as apparel requiring high-visibility for safety. Textile products treated by the flame retardant treatment process of embodiments of the present invention can also include dyes that meet or exceed the performance requirements provided in the American National Standard for High-Visibility Safety Apparel and Headwear standard ANSI/ISEA 107-2004, which is incorporated by reference herein. The dye is applied to the textile product to define a chromaticity, luminance, colorfastness, and/or minimum coefficient of retroreflection (for Level 1 retroreflective or combined-performance material) that comply with the respective requirements of ANSI/ISEA 107-2004.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of treating a textile product to impart flame retardant properties, said method comprising the steps of: providing a fabric [formed of] *comprising* yarns *comprised* of rayon continuous filaments, the yarns having outer *rayon continuous* filaments along the periphery of the yarn and inner *rayon continuous* filaments in the interior of the yarn, directing the fabric into and through a pad bath containing a phosphorus-based flame retardant compound, compressing the fabric with a first set of cooperating rolls to force the flame retardant compound into the fabric and to impregnate the yarns of the fabric, subsequently compressing the fabric with a second set of cooperating rolls to effect a second forcing of the flame retardant compound into the fabric and to impart an additional impregnation of the yarns of the fabric by the flame retardant compound so that the outer filaments of the yarns have a phosphorus content at least 25% by weight greater than the inner filaments; and curing the flame retardant compound on the fabric to render it insoluble and durably affixed to the fabric.

2. A method according to claim 1 wherein the phosphorus-based flame retardant compound is a hydroxymethyl phosphonium compound and wherein the curing step produces an insoluble polymer that is present on the fabric at an add-on level of at least 20% by weight of the fabric.

3. A method according to claim 1 wherein the curing step comprises passing the fabric through a gaseous ammonia chamber and exposing the impregnated fabric to gaseous ammonia.

4. A method according to claim 1 wherein the curing step comprises heating the fabric.

*5. A method according to claim 1 wherein the rayon continuous filaments comprise viscose rayon.*

* * * * *